(12) United States Patent
Kurosaki

(10) Patent No.: US 9,983,469 B2
(45) Date of Patent: May 29, 2018

(54) LIGHT SOURCE UNIT AND PROJECTOR HAVING THE SAME LIGHT SOURCE UNIT

(71) Applicant: CASIO COMPUTER CO., LTD., Tokyo (JP)

(72) Inventor: Hideyuki Kurosaki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/469,844

(22) Filed: Mar. 27, 2017

(65) Prior Publication Data

US 2017/0363943 A1  Dec. 21, 2017

(30) Foreign Application Priority Data

Jun. 21, 2016  (JP) .................................. 2016-122426
Dec. 12, 2016  (JP) .................................. 2016-240034

(51) Int. Cl.
| | | |
|---|---|---|
| *G03B 21/28* | (2006.01) | |
| *G02B 17/06* | (2006.01) | |
| *G03B 21/20* | (2006.01) | |
| *G02B 26/08* | (2006.01) | |
| *F21V 7/04* | (2006.01) | |
| *F21V 7/00* | (2006.01) | |

(52) U.S. Cl.
CPC ........ *G03B 21/2066* (2013.01); *F21V 7/0025* (2013.01); *F21V 7/048* (2013.01); *G02B 17/0663* (2013.01); *G02B 26/0816* (2013.01); *G03B 21/2033* (2013.01)

(58) Field of Classification Search
CPC ... F21V 7/0025; F21V 7/048; G02B 26/0816; G02B 17/006; G02B 17/0647; G02B 17/0663
USPC ..... 362/297, 304, 332, 296.05, 311.06, 346; 353/98, 99; 359/226.1, 535, 850, 874
See application file for complete search history.

(56) References Cited

U.S. PATENT DOCUMENTS

| | | | | |
|---|---|---|---|---|
| 4,629,288 A | * | 12/1986 | Wagers | .................. G09F 19/18 359/857 |
| 5,050,976 A | * | 9/1991 | Flint | ........................ G02B 5/10 343/912 |
| 7,837,332 B2 | * | 11/2010 | Gollier | ............... G03B 21/2033 353/30 |
| 2004/0240034 A1 | * | 12/2004 | Scharf | ...................... G02B 5/18 359/293 |

FOREIGN PATENT DOCUMENTS

JP  2015-6444 A  4/2015

* cited by examiner

*Primary Examiner* — William C Dowling
(74) *Attorney, Agent, or Firm* — Fitch Even Tabin & Flannery, LLP

(57) ABSTRACT

There is provided a light source unit including a semiconductor light emitting device, and a rotary mirror device having a mirror surface on a first side, and a second side to which a rotational shaft of a motor is connected, wherein the mirror surface has an undulating section shape of convex and concave shape portions, wherein the rotary mirror device is disposed so as to reflect light emitted from the semiconductor light emitting device on the mirror surface.

20 Claims, 8 Drawing Sheets

LIGHT SOURCE UNIT AND PROJECTOR HAVING THE SAME LIGHT SOURCE UNIT

CROSS-REFERENCE TO RELATED APPLICATIONS

This application is based upon and claims the benefit of priority under 35 USC 119 from Japanese Patent Application No. 2016-122426 filed on Jun. 21, 2016 and Japanese Patent Application No. 2016-240034 filed on Dec. 12, 2016, the entire disclosures of which, including the specifications, claims, drawings and abstracts, are incorporated herein by reference.

BACKGROUND OF THE INVENTION

Field of the Invention

The present invention relates to a light source unit and a projector having this light source unit.

Description of the Related Art

In these days, data projectors are used on many occasions as image projection systems which project a screen of a personal computer and a video image, as well as images based on image data stored on a memory card onto a screen. These projectors are such that light emitted from a light source is collected onto a micromirror display device called a digital micromirror device (DMD) or a liquid crystal panel, so that a color image is projected onto a screen for display thereon.

The application of these projectors is expanded from a presentation on a business scene to a domestic use in association with the propagation of personal computers and video equipment such as DVD players. Conventionally, in the mainstream of these projectors, high-intensity discharge lamps have been used as a light source. In recent years, however, various types of projectors have been developed which use, as a light source, a plurality of semiconductor light emitting devices such as laser diodes and which include a luminescent wheel which uses the semiconductor light emitting devices as an excitation light source.

A projector disclosed in Japanese Unexamined Patent Publication No. 2015-64444 includes red, blue and green laser diodes which emit, respectively, light in the red wavelength range, light in the blue wavelength range and light in the green wavelength range, an optical modulator which optically modulates laser beams from the red, blue and green laser diodes and a projection optical system which projects the laser beams which exit from the optical modulator onto a screen. The red, blue and green laser beams emitted from the red, blue and green laser diodes are incident on the optical modulator by way of a light diffusing device. This light diffusing device has a circular disc shape, and a rotational shaft of a motor is connected to a center of the light diffusing device. The red, blue and green laser beams emitted from the red, blue and green laser diodes pass through a radially outer side of the light diffusing device which is driven to rotate. In the projector disclosed in Japanese Unexamined Patent Publication No. 2015-64444, speckle noise of each of the red, blue and green laser beams is reduced as a result of the laser beams passing through the light diffusing device which is driven to rotate.

When the disc-shaped light diffusing device is driven to rotate, the rotational shaft of the motor is attached to the center of the light diffusing device. Then, the point where the laser beams pass through the light diffusing device is not the central portion but the position situated on the radially outer side of the light diffusing device. Consequently, there may be situations where the light diffusing device is enlarged in size, whereby the light source unit and the projector are also enlarged in size accordingly.

SUMMARY OF THE INVENTION

The invention has been made in view of the situations described above, and an object thereof is to provide a light source unit which can not only reduce the speckle noise of light emitted from a semiconductor light emitting device but also reduce the size thereof and a projector which includes this light source unit.

According to an aspect of the invention, there is provided a light source unit having:
a semiconductor light emitting device; and
a rotary mirror device having a mirror surface on a first side, and a second side to which a rotational shaft of a motor is connected, wherein the mirror surface has an undulating section shape of convex and concave shape portions, wherein
the rotary mirror device is disposed so as to reflect light emitted from the semiconductor light emitting device on the mirror surface.

According to another aspect of the invention, there is provided a projector having:
the light source device described above;
a display device on which light source light from the light source unit is shone to thereby form image light; and
a projection-side optical system for projecting the image light emitted from the display device onto a screen; and
a projector control unit for controlling the display device and the light source unit.

DETAILED DESCRIPTION OF THE PREFERRED EMBODIMENTS

Figure 1:
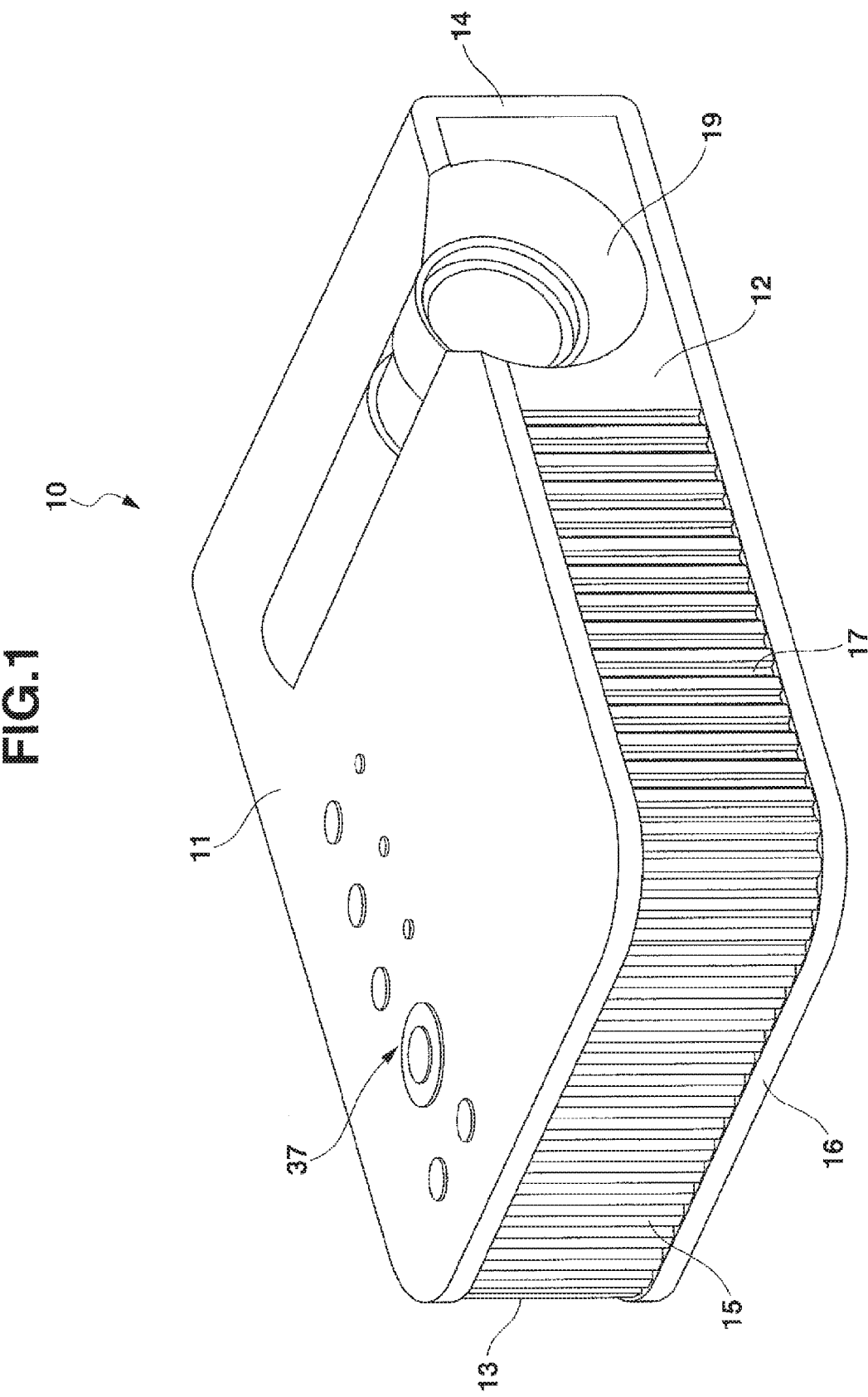
FIG. 1 is an external perspective view showing a projector according to a first embodiment of the invention.

Referring to the drawings, embodiments will be described in which the invention is applied to a projector of a DLP (a registered trademark) (Digital Light Processing) system.

First Embodiment

Hereinafter, a first embodiment of the invention will be described based on the drawings. FIG. 1 is an external perspective view of a projector 10. In this embodiment, when referred to in relation to the projector 10, left and right denote, respectively, left and right in relation to the projecting direction of the projector 10, and when referred to in relation to the projector 10, front and rear denote, respectively, front and rear in relation to the direction of a screen and a traveling direction of a pencil of light that is emitted from the projector 10 towards the screen.

As is shown in FIG. 1, a casing of the projector 10 has a virtually rectangular parallelepiped shape and is made up of side panels such as a front panel 12, a back panel 13, a left panel 14 and a right panel 15, an upper panel 11 and a lower panel 16. The projector 10 has a projecting portion 19 at a left end portion of the front panel 12. Further, a plurality of outside air inlet and inside air outlet holes 17 are provided in the front panel 12. Although not shown, the projector 10 includes an IR reception unit which receives a control signal from a remote controller.

In addition, a keys/indicators unit 37 is provided on the upper panel 11. Disposed on this keys/indicators unit 37 are keys and indicators which include a power supply switch key, a power indicator, a projection switch key, and an overheat indicator. The power indicator informs whether a power supply is on or off. The projection switch key switches on or off the projection by the projector 10. The overheat indicator informs of an overheat condition occurring in a light source unit, a display device, a control circuit or the like when they really overheat.

Further, various types of terminals including an input/output connector unit, a power supply adaptor plug and the like are provided on the back panel 13. The input/output connector unit includes a USB terminal, a video signal input D-SUB terminal into which analog RGB video signals are inputted, an S terminal, an RCA terminal, a voice output terminal and the like. Additionally, a plurality of outside air inlet holes are formed in the back panel 13.

Figure 2:
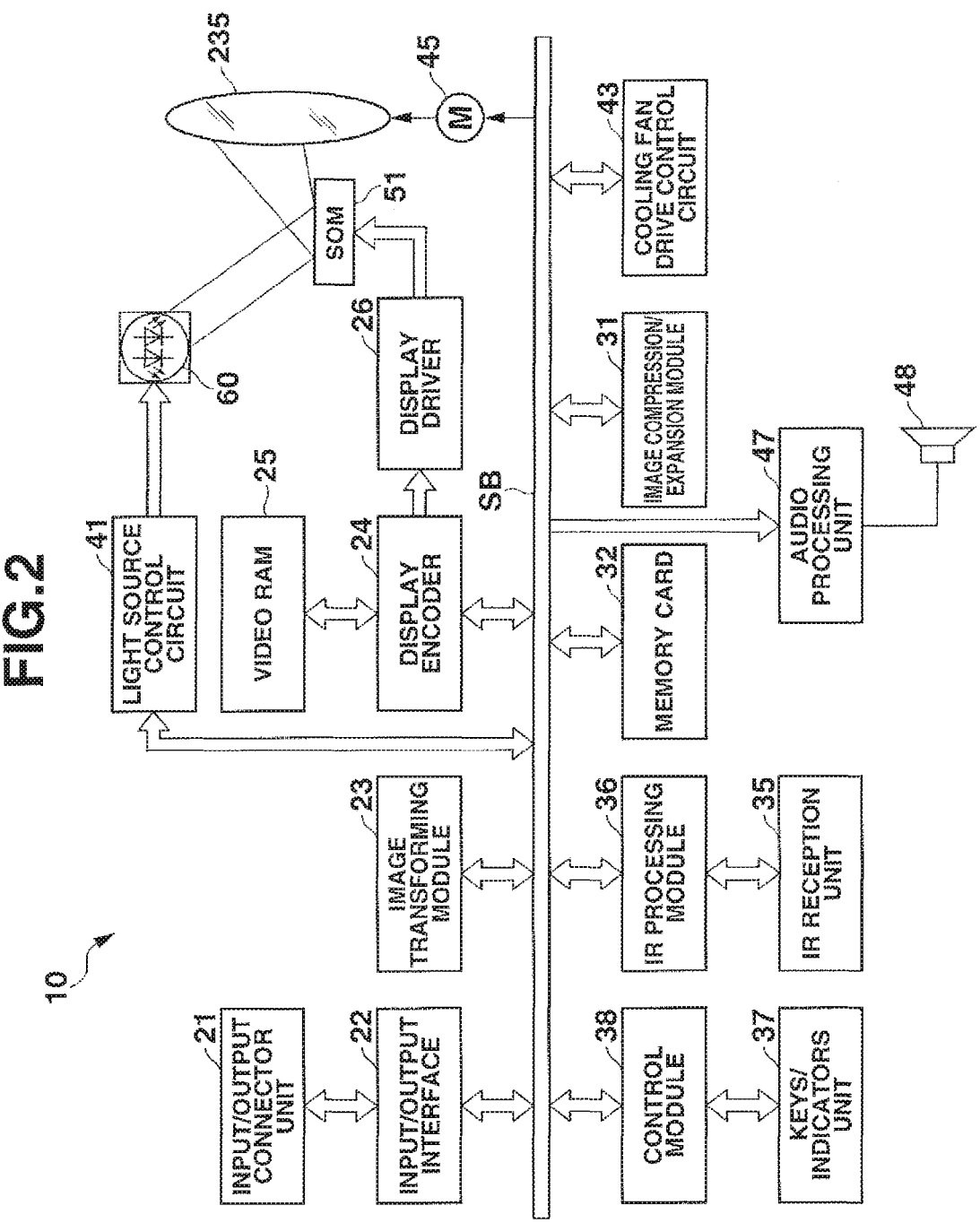
FIG. 2 is a block diagram showing functional blocks of the projector according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26.

This control module 38 governs the control of respective operations of circuitries within the projector 10 and is made up of a CPU, a ROM which stores in a fixed fashion operation programs of various types of settings, a RAM which is used as a working memory.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module. The display driver 26 drives a display device 51, which is a spatial optical modulator (SOM), at an appropriate frame rate in response to the image signal outputted from the display encoder 24. The projector 10 shines a pencil of light which is emitted from a light source unit 60 onto the display device 51 via a light source-side optical system, whereby an optical image (image light) is formed by using reflected light which is reflected by the display element 51. The image so formed is then projected onto a screen, not shown, for display thereon via a projection-side optical system. In addition, a movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes and the compressed data is sequentially written on a memory card 32 which is configured as a detachable recording medium.

Further, when in a reproducing mode, the image compression/expansion unit 31 reads out the image data recorded on the memory card 32 and expands the individual image data which make up a series of dynamic images frame by frame. Then, the image compression/expansion unit 31 outputs the image data to the display encoder 24 via the image transforming module 23 so as to enable the display of dynamic images based on the image data stored on the memory card 32.

Then, operation signals generated at the keys/indicators unit 37 which includes the main keys and indicators which are provided on the upper panel 11 are sent out directly to the control module 38. Key operation signals from the remote controller are received by the IR reception unit 35, and a code signal demodulated at an IR processing unit 36 is outputted to the control module 38.

An audio processing unit 47 is connected to the control module 38 via the system bus (SB). This audio processing module 47 includes a circuitry for a sound source such as a PCM sound source. When the projector 10 is in a projection mode and the reproducing mode, the audio processing unit 47 converts audio data into analog signals and drives a speaker 48 to output loudly sound or voice based on the audio data.

The control module 38 controls a light source control circuit 41 which is configured as a light source control unit. The light source control circuit 41 controls individually a red, green and blue light sources of the light source unit 60 so as to emit lights in the red, green and blue wavelength ranges, respectively, therefrom so that the lights in the specified wavelength ranges which are required in producing an image are emitted from the light source unit 60.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating by use of a timer even after the power supply to the main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
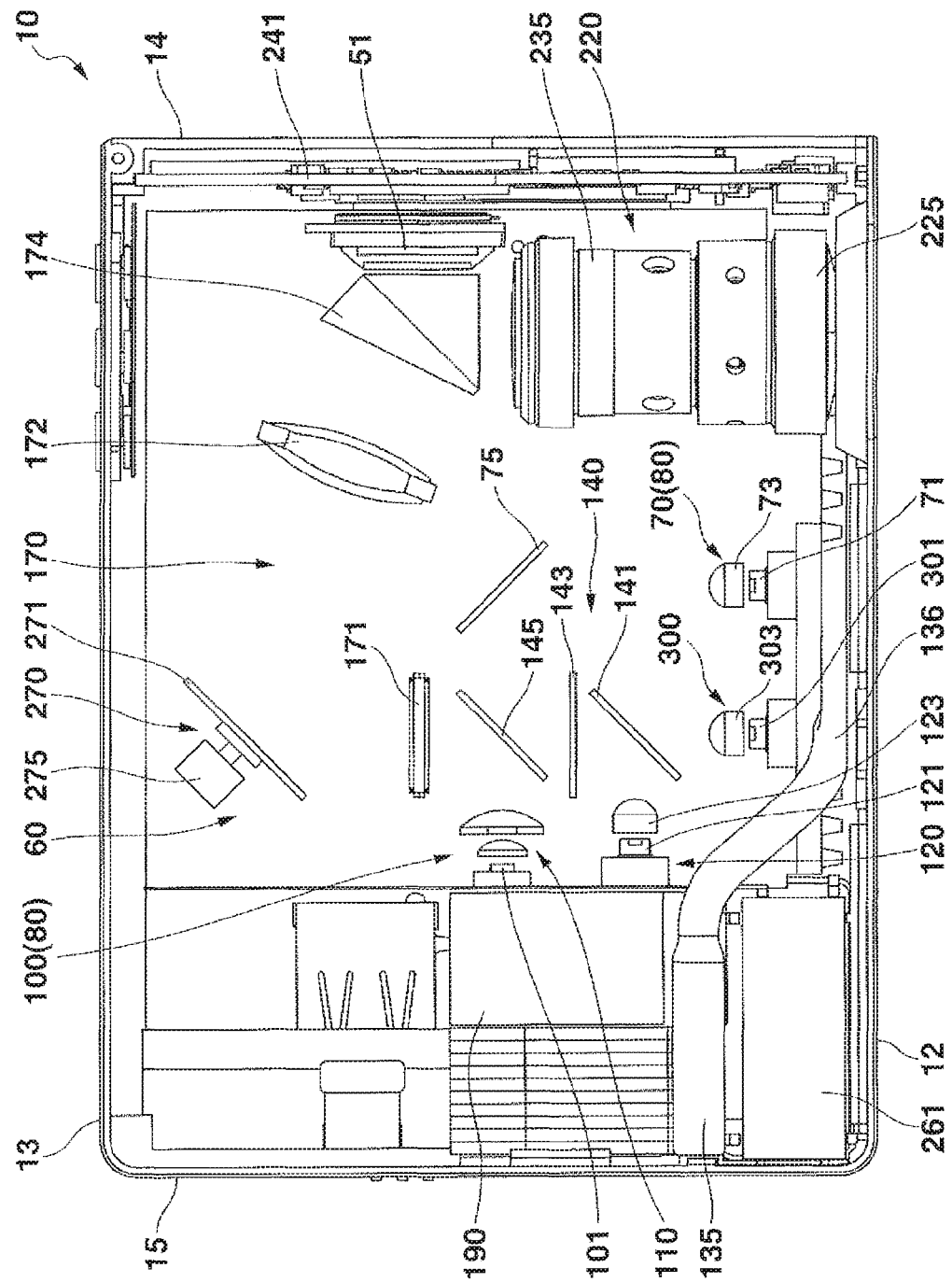
FIG. 3 is a schematic plan view showing an internal construction of the projector according to the first embodiment of the invention.

Next, an internal construction of the projector 10 will be described based. FIG. 3 is a schematic plan view showing the internal construction of the projector 10. The projector 10 includes the light source unit 60 which is disposed in a virtually central portion thereof and a projection-side optical system 220 which is disposed near the left panel 14 and which includes a lens barrel 225. The projector 10 includes the display device 51, which is a DMD (Digital Micromirror Device), and this display device 51 is disposed parallel to the left panel 14 between the lens barrel 225 and the back panel 13.

The light source unit 60 includes a light guiding optical system 140 and a light source-side optical system 170. The light guiding optical system 140 aligns axes of light in the red wavelength range, light in the blue wavelength range and light in the green wavelength range on the same optical path for emission towards a microlens array 171 of the light source-side optical system 170. The light source-side optical system 170 shines the lights in the red, blue and green wavelength ranges whose axes are aligned on the same optical path onto the display device 51 and causes image lights emitted from the display device 51 to be incident on the projection-side optical system 220. Further, the projector 10 includes a control circuit board 241 near the left panel 14. This control circuit board 241 includes a power supply circuit block and a light source control block.

The light source unit 60 includes a green light source device 80 which emits light in the green wavelength range, a red light source device 120 which emits light in the red wavelength range, and a blue light source device 300 which emits light in the blue wavelength range. The green light source device 80 is made up of an excitation light shining device 70 and a luminescent plate device 100.

The excitation light shining device 70 is disposed virtually at a center of the projector 10 in relation to a left-and-right or transverse direction thereof and near the front panel 12. The excitation light shining device 170 includes a blue laser diode 71, which is a semiconductor light emitting device, as an excitation light source. The blue laser diode 71 is disposed so that an optical axis thereof is at right angles to the front panel 12. A heat pipe 136 is disposed between the blue laser diode 71 and the front panel 12. Here, the heat pipe 136 is connected to a heat sink 135.

A collimator lens 73 is disposed on the optical axis of the blue laser diode 71, and this collimator lens 73 converts light emitted from the blue laser diode 71 into parallel light so as to enhance the directivity of the emitted light. A reflecting mirror 75 is disposed to a side of the collimator lens 73 which faces the back panel 13, and this reflecting mirror 75 turns light emitted from the collimator lens 73 through 90 degrees in the direction of the right panel 15.

The luminescent plate device 100 includes a luminescent plate 101 and a collective lens group 110 which is disposed on a side of the luminescent plate 101 which faces the left panel 14. The collective lens group 110 collects excitation light emitted from the excitation light shining device 70 and reflected by the reflecting mirror 75 to the luminescent plate 101 and collects a pencil of light emitted from the luminescent plate 101 in the direction of the left panel 14 for emission in the direction of the left panel 14. The luminescent plate 101 is disposed parallel to the left panel 14 and includes a luminous light emitting area which is formed by laying out a green luminescent material layer on a square flat plate whose surface is mirror finished. This green luminescent material layer is formed of a binder of a silicone resin having high heat resistance and light transmissivity and a green luminescent material which is uniformly scattered in this binder. When light in the blue wavelength range which is emitted from the excitation light shining device 70 as excitation light is shone onto the green luminescent material layer of the luminescent plate 101, the green luminescent material in the green luminescent material layer is excited, whereby light in the green wavelength range is emitted in every direction from the green luminescent material.

The red light source device 120 is disposed slightly closer to the front panel 12 of the projector 10. The red light source device 120 includes a red laser diode 121, which is a semiconductor light emitting device, as a red light source. The red laser diode 121 is disposed so that an axis of light emitted therefrom is at right angles to axes of light emitted from the excitation light shining device 70 and light emitted from the blue light source device 300. A collimator lens 123 is disposed on an optical axis of the red laser diode 121, and this collimator lens 123 converts light emitted from the red laser diode 121 into parallel light so as to enhance the directivity of the light.

The blue light source device 300 is disposed on a side of the excitation light shining device 70 which faces the right panel 15. The blue light source device 300 includes a blue laser diode 301, which is a semiconductor light emitting device, as a blue light source. The blue laser diode 301 is disposed so that an optical axis thereof is at right angles to the front panel 12. Then, the heat pipe 136 is disposed between the blue laser diode 301 and the front panel 12. A collimator lens 303 is disposed on the optical axis of the blue laser diode 301, and this collimator lens 303 converts light emitted from the blue laser diode 301 into parallel light so as to enhance the directivity of the emitted light.

As has been described above, the heat pipe 136, which is connected to the heat sink 135, is disposed on sides of the excitation light shining device 70 and the blue light source device 300 which face the front panel 12 while being connected to the excitation light shining device 70 and the blue light source device 300. The heat sink 135 is disposed on an inner side of the right panel 15 and near the front panel 12. Further, a heat sink 190 is disposed on sides of the luminescent plate device 100 and the red light source device 120 which face the right panel 15 and on a side of the heat sink 135 which faces the back panel 13 while being connected to the luminescent plate device 100 and the red light source device 120. Then, a cooling fan 261 is disposed between the heat sink 135 and the front panel 12. By arranging the cooling devices in the way described above, heat generated by the excitation light shining device 70 and the blue light source device 300 is dissipated by the heat sink 135 by way of the heat sink 136. Heat generated by the luminescent plate device 100 and the red light source device 120 is dissipated by the heat sink 190. Then, the heat sinks 135, 190 are cooled by the cooling fan 261.

The light guiding optical system 140 includes a first dichroic mirror 141, a diffusing plate 143, and a second dichroic mirror 145. The first dichroic mirror 141 is disposed in a position where an axis of light in the blue wavelength range emitted from the blue light source device 300 intersects an axis of light in the red wavelength range emitted from the red light source device 120 at right angles. Then, the first dichroic mirror 141 transmits light in the blue wavelength range and reflects light in the red wavelength range so as turn the axis of the light in the red wavelength range through 90 degrees in the direction of the back panel 13. The axis of the light in the blue wavelength range emitted from the blue light source device 300 and the axis of the light in the red wavelength range emitted from the red light source device 120 are aligned on the same optical path by the first dichroic mirror 141.

The diffusing plate 143 is disposed on a side of the first dichroic mirror 141 which faces the back panel 13. The diffusing plate 143 diffuses the light in the blue wavelength range which passes through the first dichroic mirror 141 and the light in the red wavelength range which is reflected by the first dichroic mirror 141. The light in the red wavelength range and the light in the blue wavelength range, which are laser beams, can be shone onto a virtually whole surface of the microlens array 171 by the diffusing plate 143 which is disposed on an incident side of the microlens array 171.

The second dichroic mirror 145 is disposed on a side of the diffusing plate 143 which faces the back panel 13 in a position where the light in the blue wavelength range emitted from the blue light source device 300 and the light in the red wavelength range emitted from the red light source device 120 intersect the light in the blue wavelength range emitted from the excitation light shining device 70 and reflected by the reflecting mirror 75 and the light in the green wavelength range emitted from the luminescent plate device, respectively, at right angles. The second dichroic mirror 145 transmits the light in the blue wavelength range and the light in the red wavelength range and reflects the light in the green wavelength range. The axis of the light in the green wavelength range emitted from the luminescent plate device 100 is turned through 90 degrees for emission in the direction of the back panel 13 by the second dichroic mirror 145 so that the axis of the light in the green wavelength range is aligned with the axes of the light in the blue wavelength range emitted from the blue light source device 300 and the light in the red wavelength range emitted from the red light source device 120.

The light source-side optical system 170 includes the microlens array 171, a rotary mirror device 270, a collective lens 172, and an RTIR prism 174. The microlens array 171 is disposed on a side of the second dichroic mirror 145 which faces the back panel 13. This microlens array 171 distributes uniformly the intensity of light in each of the red, blue and green wavelength ranges.

The microlens array 171 is formed by arranging lens-shaped microscopic lenses, which are biconvex lenses, having a horizontally elongated rectangular shape when seen from thereabove into a grating configuration. Then, the rotary mirror device 270 is disposed on a side of the microlens array 171 which faces the back panel 13 (that is, on an optical path on an exit side of the microlens array 171). An axis of light emitted from the microlens array 171 is turned towards the collective lens 172 which is disposed near the left panel 14 by the rotary mirror device 270.

Figure 4A:
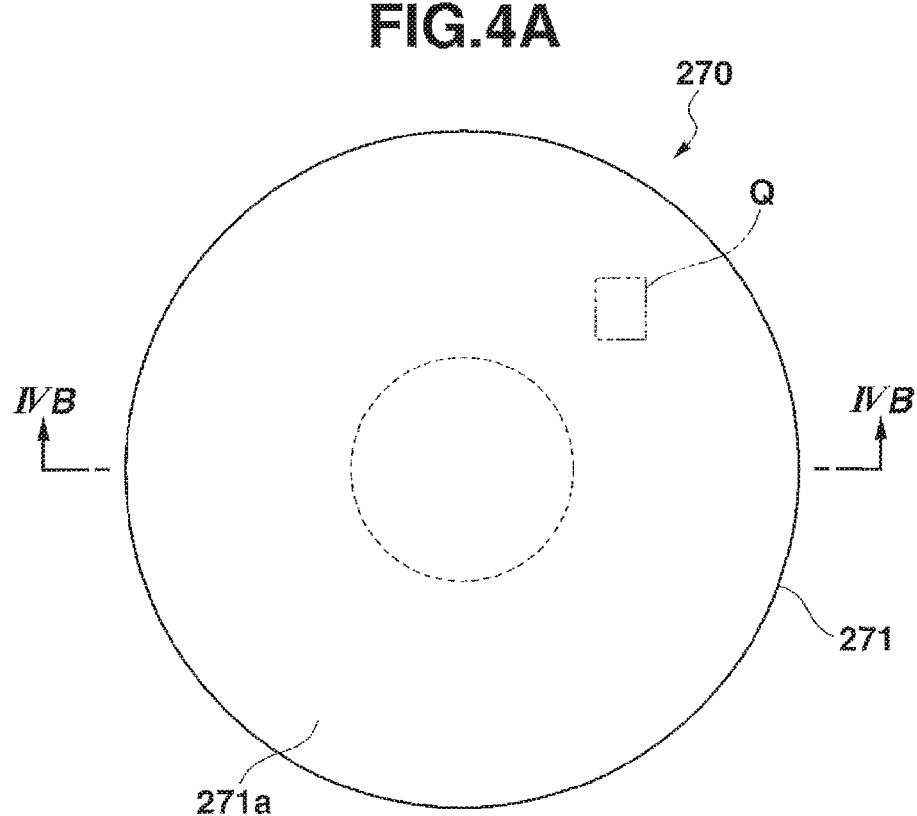
FIG. 4A is a schematic front view of a rotary mirror device according to the first embodiment of the invention.
Figure 4B:
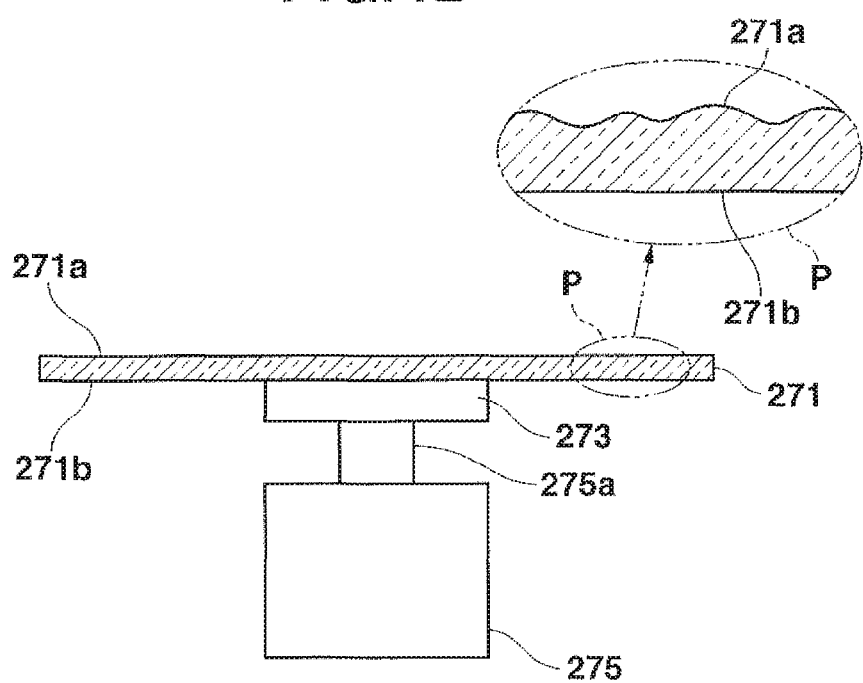
FIG. 4B is a schematic sectional view showing a section taken along a line IV(b)-IV(b) in FIG. 4A.

As shown in FIGS. 4A and 4B, the rotary mirror device 79 includes a mirror plate 271 and a motor 275. The mirror plate 271 is formed into a circular disc shape, and a front side, which is one of sides, of the mirror plate 271 is made into a mirror surface 271a. As shown in an enlarged view of a portion P in FIG. 4B, the mirror surface 271a has an undulating section shape of fine convex and concave shape portions. Namely, a number of straight grooves are formed on the mirror surface 271a shown in FIG. 4A from an upper end to a lower end thereof, and the grooves are formed unevenly so that their depths and widths differ.

In this embodiment, the mirror surface 271a is described as having the undulating section shape of uneven convex and concave shape portions which is formed by the straight grooves. However, the invention is not limited to this configuration. For example, the mirror surface of the mirror plate 271 can have an undulating section shape of convex and concave shape portions which is formed by straight grooves whose depths and widths are even. Alternatively, the mirror surface of the mirror plate 271 can also have an undulating section shape of a number of fine irregularities which is formed by sandblasting the mirror surface.

Figure 5A:
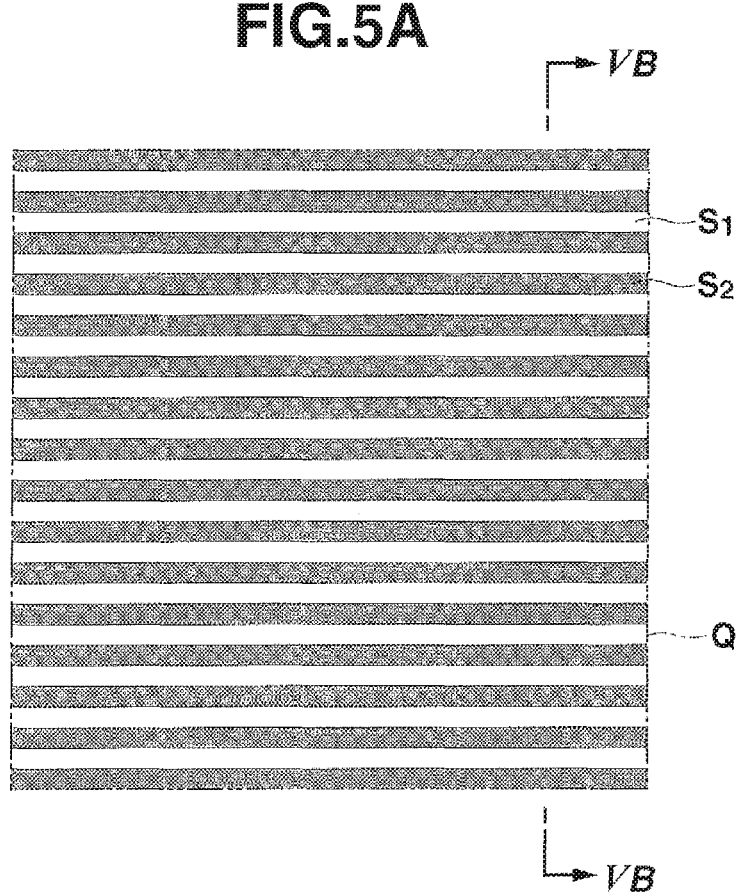
FIG. 5A is a schematic enlarged view of a portion of a mirror surface of the rotary mirror device according to the first embodiment of the invention which corresponds to a portion Q in FIG. 4A, showing an example of a modified mirror surface.
Figure 5B:
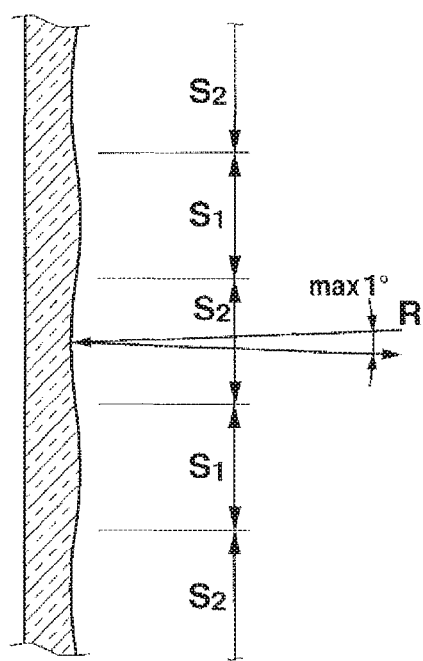
FIG. 5B is an enlarged sectional view of a section taken along a line V(b)-V(b) in FIG. 5A FIGS. 6A and 6B both show schematic enlarged views of the portion of the mirror surface of the rotary mirror device according to the first embodiment of the invention which corresponds to the portion Q in FIG. 4A, showing examples of modified mirror surfaces.

A specific construction of an undulating section shape of convex and concave shape portions given to a mirror surface 271a will be described as a modified example of the first embodiment. FIG. 5A is an enlarged view of a portion of the mirror surface 271a which corresponds to the portion Q in FIG. 4A. FIG. 5B is an enlarged sectional view taken along a line V(b)-V(b) in FIG. 5A. Here, in FIG. 5A, white areas S1 denote curved surfaces which are raised in section and grey areas S2 denote curved surfaces which are depressed in section.

In this modified example, the curved surfaces which are raised in section (the areas S1) and the curved surfaces which are depressed in section (the areas S2) are disposed successively and parallel in an alternate fashion at the same pitch. A desirable pitch between the curved surfaces which are raised in section (the areas S1) and the curved surfaces which are depressed (the areas S2) in section is in the range of 30 to 80 μm. Then, the mirror surface 271a has a section shown in FIG. 5B. A light ray R moves as shown in FIG. 5B by adopting the sectional construction described above. A difference between an incident angle and a reflecting angle is 1° at the most.

Figure 6A:
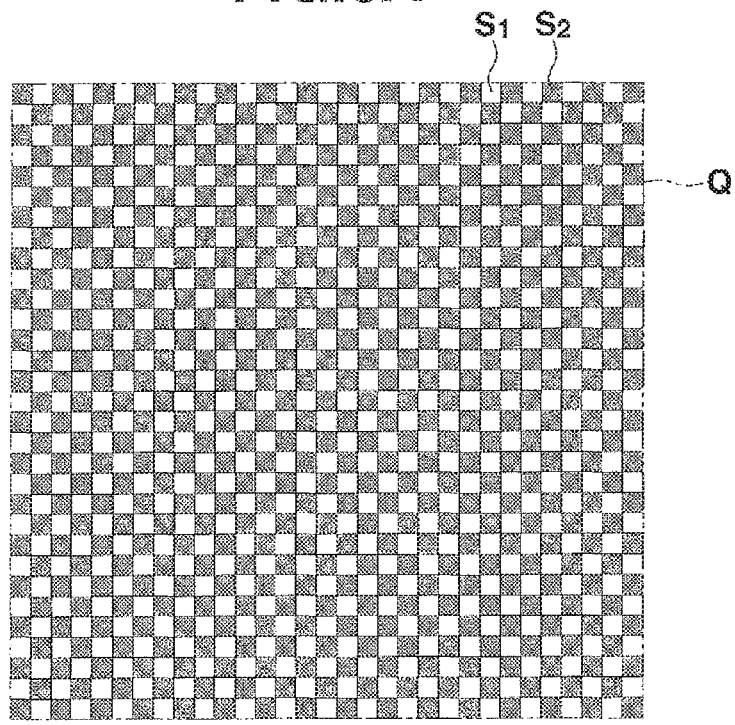
Figure 6B:
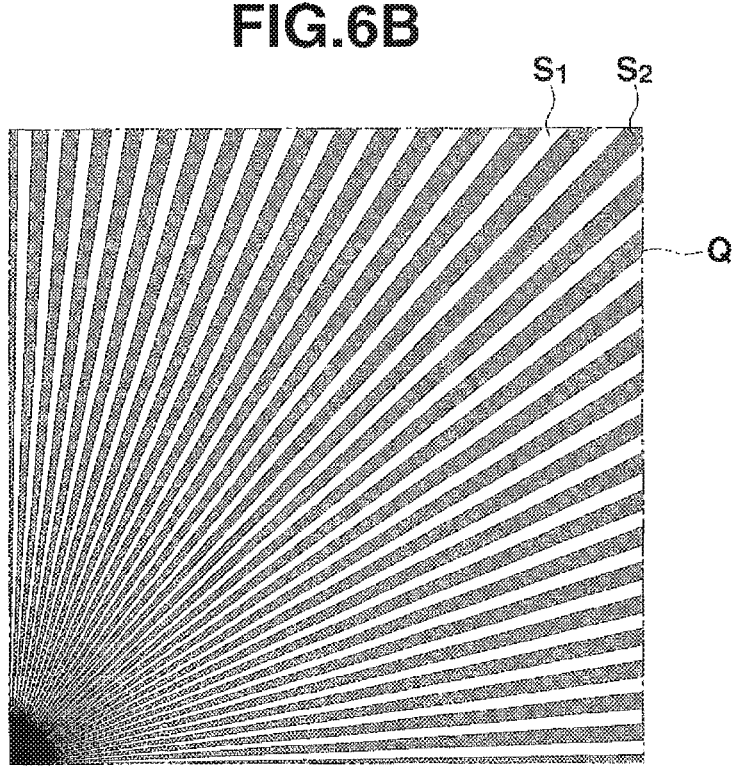

FIGS. 6A and 6B show other modified examples. FIGS. 6A and 6B are enlarged views of portions on the mirror surface 271a which correspond to the portion Q in FIG. 4A. In FIGS. 6A and 6B, too, white areas S1 denote curved surfaces which are raised in section and grey areas S2 denote curved surfaces which are depressed in section. FIG. 6A shows a construction in which the curved surfaces which are raised in section (the areas S1) and the curved surfaces which are depressed in section (the areas S2) are arranged successively in an alternate fashion at the same pitch both in an X-axis direction (a first direction) and a Y-axis direction (a second direction which is at right angles to the first direction) into a matrix configuration. In FIG. 6A, a desirable pitch between the curved surfaces which are raised in section (the areas S1) and the curved surfaces which are depressed in section (the areas S2) is in the range of 30 to 80 μm.

The curved surfaces which are raised in section (the areas S1) and the curved surfaces which are depressed in section (the areas S2) are formed successively in an alternate fashion at a pitch like that shown in FIG. 6A near the center of the mirror surface 271a. However, the curved surfaces which are raised in section (the areas S1) and the curved surfaces which are depressed in section (the areas S2) do not have to be formed at the same pitch all over the surface of the mirror surface 271a. The curved surfaces which are raised in section (the areas S1) and the curved surfaces which are depressed in section (the areas S2) may be formed at such a pitch that changes step by step from the center to an outer circumferential side of the mirror surface 271a.

For example, a construction may be adopted in which the curved surfaces which are raised in section (the areas S1) and the curved surfaces which are depressed in section (the areas S2) are formed successively in an alternate fashion at a pitch like that shown in FIG. 6A in a first area which lies near the center of the mirror surface 271a, while in a second area which lies radially outwards of the first area to be positioned halfway from the center and an outer circumference of the mirror surface 271a, the curved surfaces which are raised in section (the areas S1) and the curved surfaces which are depressed in section (the areas S2) are formed in the X-axis direction and the Y-axis direction at a pitch which is twice larger than the pitch shown in FIG. 6A, whereby the areas of the curved surfaces which are raised in section (the areas S1) and the curved surfaces which are depressed in section (the areas S2) both become four times larger than those shown in FIG. 6A. Further, in a third area which lies radially outwards of the second area, the curved surfaces which are raised in section (the areas S1) and the curved surfaces which are depressed in section (the areas S2) are formed in the X-axis direction and the Y-axis direction at a pitch which is twice larger than the pitch in the second area, whereby the areas of the curved surfaces which are raised in section (the areas S1) and the curved surfaces which are depressed in section (the areas S2) become four times larger than those in the second area. In other words, in the third area, the curved surfaces which are raised in section (the areas S1) and the curved surfaces which are depressed in section (the areas S2) are formed in the X-direction and the Y-axis direction at the pitch which is four times larger than the pitch shown in FIG. 6A, whereby the areas of the curved surfaces which are raised in section (the areas S1) and the curved surfaces which are depressed in section (the areas S2) become 16 times larger than those shown in FIG. 6A.

In this way, the pitch at which the curved surfaces which are raised in section (the areas S1) and the curved surfaces which are depressed in section (the areas S2) of the undulating section shape of convex and concave shape portions are formed is increased step by step from the central portion to the outer circumference of the mirror surface 271a, and the areas of the curved surfaces which are raised in section (the areas S1) and the curved surfaces which are depressed in section (the areas S2) are both made to become smaller at the central portion and larger on the outer circumferential side of the mirror surface 271a, whereby the amount of displacement can become greater at the central portion of the mirror surface 271a. Consequently, laser beams are reflected a plurality of times similarly at the central portion and on the outer circumferential side of the mirror surface 271a of the mirror plate 271 where the undulating section shape of convex and concave shape portions is given and are then incident on the collective lens 172 as the mirror plate 271 rotates, thereby making it possible to reduce the speckle noise thereof.

FIG. 6B shows a construction in which curved surfaces which are depressed in section (areas S1) and curved surfaces which are raised in section (areas S2) are formed so as to extend radially from the center towards the outer circumferential side of the mirror surface 271a while being arranged sideways successively in an alternate fashion. Thus, the amount of displacement can be great at the central portion of the mirror surface 271a as in the case with the matrix construction where the pitch at which the curved surfaces which are raised in section (the areas S1) and the curved surfaces which are depressed in section (the areas S2) are formed is increased step by step from the center towards the outer circumferential side of the mirror surface 271a.

A circular disc-shaped connecting plate 273 which connects a rotational shaft 275a of the motor 275 and the mirror plate 271 together is fixed to the other surface of the mirror plate 271. The connecting plate 273 can be attached to a back surface 271b of the mirror plate 271 with an adhesive. This can obviate the necessity of opening a hole in the mirror surface 271a, allowing a whole surface of the mirror surface 271a to be made into a reflecting surface.

Returning to FIG. 3, the collective lens 172 is disposed slightly rearwards and leftwards of the center of the projector 10. Light reflected by the rotary mirror 270 is incident on the collective lens 172. The light collected to the collective lens 172 is incident on the RTIR prism (Reverse Total Internal Reflection Prism) 174. The light that has been incident on the RTIR prism 174 is shone onto the display device 51 at a predetermined angle. "On" light reflected on an image forming surface of the display device 51 is incident on the RTIR prism 174 and is then incident on the projection-side optical system 220 as projected light. Then, the projected light exits from the projection portion 19 of the projection-side optical system 220, whereby an image is projected onto a screen.

A lens barrel 225 of the projection-side optical system 220 is made into a variable-focus lens with a zooming function which includes a fixed lens group and the movable lens group 235 which are incorporated in the lens barrel 225. The movable lens group 235 can be driven for zooming and focusing by the lens motor functioning as a drive source.

By configuring the projector 10 in the way described heretofore, when light is emitted from the excitation light shining device 70, the red light source device 120 and the blue light source device 300 at different timings, lights in the red, green and blue wavelength ranges are incident on the display device 51 by way of the light guiding optical system 140 and the light source-side optical system 170. Then, the DMD, which is the display device 51, of the projector 10 displays the lights in the red, green and blue wavelength ranges in a time-sharing fashion in accordance to the data, whereby a color image can be projected onto the screen.

Then, the lights which pass through the microlens array 171 while the axes thereof are aligned on the same optical path are reflected by the rotary mirror device 270 to be incident on the collective lens 172. Here, when the lights are reflected by the rotary mirror device 270, the mirror plate 271 is rotating continuously in one direction (for example, in a clockwise direction) at a constant speed. Then, in particular, light in the blue wavelength range, which is a laser beam, emitted from the blue light source device 300 and light in the red light wavelength range, which is a laser beam, emitted from the red light source device 120 are reflected a plurality of times at the portion of the mirror surface 271a of the mirror plate 271 which has the undulating section shape of fine convex and concave shape portions as the mirror plate 271 rotates and are then incident on the collective lens 172, whereby the speckle noise is reduced.

Second Embodiment

Figure 7:
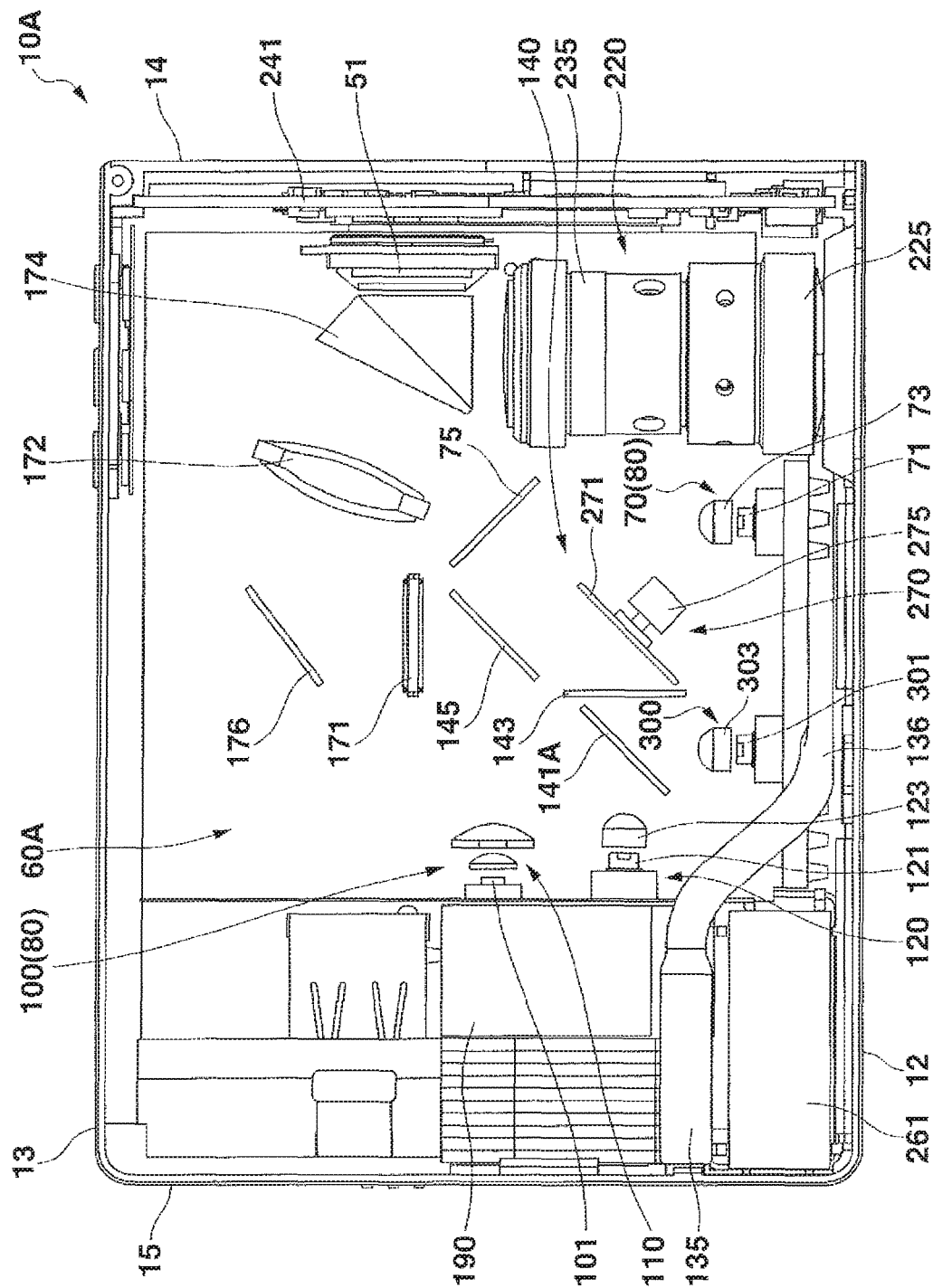
FIG. 7 is a schematic plan view showing an internal construction of a projector according to a second embodiment of the invention.

Next, a second embodiment of the invention will be described based on FIG. 7. Although in the projector 10 of the first embodiment, the rotary mirror device 270 is disposed on the optical axis of the microlens array 170 on the exit side thereof, in a projector 10A shown in FIG. 7, the position of a rotary mirror device 270 is changed, so that the rotary mirror device 270 is disposed on an optical axis of a microlens array 171 on an entrance side thereof. In the following description, like reference numerals will be given to like members and portions to those of the first embodiment, and the description thereof will be simplified or omitted.

A first dichroic mirror 141A is disposed in a light guiding optical system 140 of the projector 10A of this embodiment in place of the first dichroic mirror 141. The first dichroic mirror 141A is disposed in a position where an axis of light in the blue wavelength range emitted from a blue light source device 300 intersect an axis of light in the red wavelength range emitted from a red light source device 120 at right angles. This first dichroic mirror 141A transmits light in the red wavelength range and reflects light in the blue wavelength range so as to turn an axis of the light in the blue wavelength range through 90 degrees in the direction of a left panel 14.

The rotary mirror device 270 provided in the light guiding optical system 140 is disposed to a side of the first dichroic mirror 141A which faces a left panel 14. The rotary mirror device 270 reflects light in the red wavelength range emitted from the red light source device 120 and transmitted through the first dichroic mirror 141A and light in the blue wavelength range emitted from the blue light source device 300 and reflected by the first dichroic mirror 141A so that axes of the red and blue lights are turned through 90 degrees in the direction of a back panel 13.

In this embodiment, a reflecting mirror 176, which is part of a light source-side optical system. 170, is disposed to aside of the microlens array 171 which faces the back panel 13. The lights in the red, green and blue wavelength ranges which pass through the microlens array 171 are caused to be incident on the collective lens 172 by the reflecting mirror 176 and are then incident on the RTIR prism 174.

In this embodiment, light in the red wavelength range and light in the blue wavelength range are reflected by the rotary mirror device 270 to thereby be incident on the microlens array 171. Here, when a mirror surface 271a of the rotary mirror device 270 reflects such lights while rotating, axes of the lights so reflected deviate (vibrate) minutely. However, as a result of the lights reflected by the rotary mirror device 270 passing through an indefinite number of microscopic lenses on the microlens array 171, the deviation (vibration) of the axes of the red and blue lights are reduced. Consequently, it is possible to obtain clear image lights. As shown in FIG. 7, in this embodiment, a diffusing plate 143 is disposed between the first dichroic mirror 141A and a mirror plate 271. By adopting this configuration, light emitted from a blue laser diode 301 and light emitted from a red laser diode 121 are diffused while passing through the diffusing plate 143, whereafter the red and blue lights are reflected on the mirror plate 271 of the rotary mirror device 270.

The diffusing plate 143 may be disposed between the mirror plate 271 and a second dichroic mirror 145.

Third Embodiment

Figure 8A:
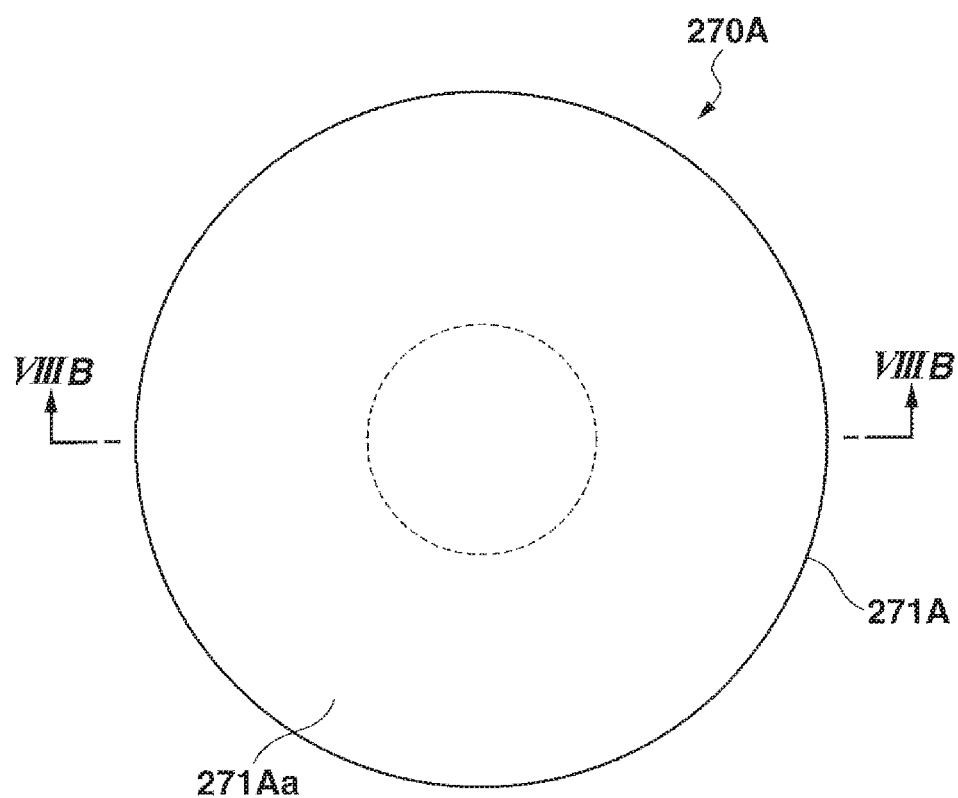
FIG. 8A is a schematic front view of a rotary mirror device according to a third embodiment of the invention.
Figure 8B:
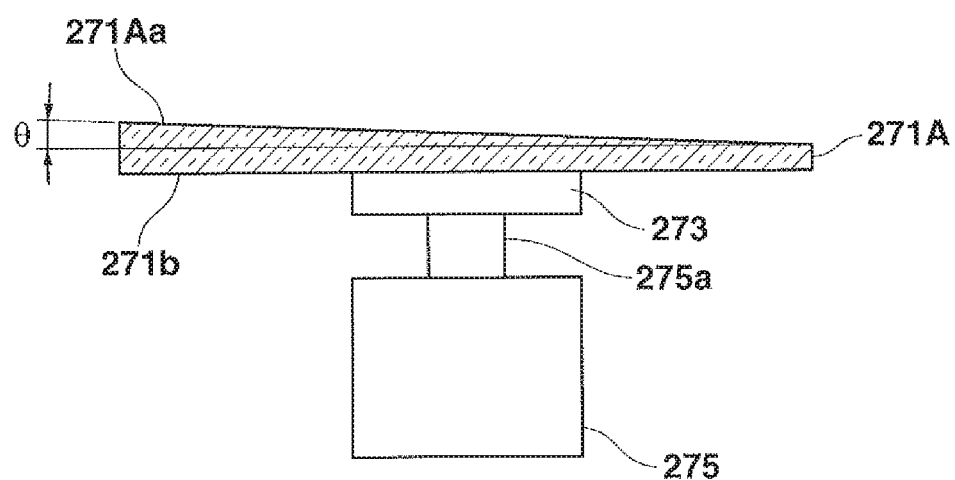
FIG. 8B is a schematic sectional view showing a section taken along a line VIII(b)-VIII(b) in FIG. 8A.

A third embodiment of the invention will be described based on FIGS. 8A and 8B. In this embodiment, the rotary mirror devices 270 in the first embodiment and the second embodiment are modified, and a rotary mirror device 270A is provided which includes an inclined mirror plate 271A as shown in FIGS. 8A and 8B. Namely, a mirror surface 271Aa of the mirror plate 271A of the rotary mirror device 270A is inclined at a certain angle (90°−θ) relative to an axial center of a rotational shaft 275a of a motor 275. Namely, the mirror surface 271Aa of the mirror plate 271A is formed so as to be inclined by a predetermined angle θ relative to a back surface 271b which is a surface normal to a rotational shaft 275a of a motor 275. The angle θ is preferably in the range of 0.1° to 0.2°. In addition, as in the case with the mirror plates 271 of the first embodiment and the second embodiment, the mirror surface 271Aa of the mirror plate 271A of the third embodiment has an undulating section shape of convex and fine concave shape portions. Like reference numerals will be given to like portions and members to those of the rotary mirror devices 270 of the first embodiment and the second embodiment, and the description thereof will be simplified or omitted.

The rotary mirror device 270A of this embodiment can be disposed in place of the rotary mirror devices 270 of the projector 10 of the first embodiment and the projector 10A of the second embodiment. Then, when light is reflected while the mirror plate 271A of the rotary mirror device 270A is being rotated, a shining position on the mirror surface 271Aa onto which laser beams are shone changes in a front-and-rear direction (in an up-and-down direction in FIG. 8B). Thus, since the number of times of reflection of light or laser beams on the mirror surface 271Aa is increased more effectively, speckle noise can be reduced more. In particular, when compared with a case where the mirror surface 271Aa is disposed at right angles to the rotational shaft of the motor, this embodiment is effective in reducing speckle noise of laser beams near the rotational center of the mirror plate 271A.

Thus, the light source units 60, 60A of the embodiments have the blue laser diodes 301, which are semiconductor light emitting devices, of the blue light source devices 300, the red laser diodes 121 of the red light source devices 120 and the rotary mirror devices 270, 270A, respectively. Then, the rotary mirror devices 270, 270A are each disposed so as to reflect light emitted from the blue laser diode 301 and light emitted from the red laser diode 121. By doing so, it is possible to reduce speckle noise of light in the blue wavelength range, which is a laser beam, emitted from the blue light source device 300 and light in the red wavelength range, which is a laser beam, emitted from the red light source device 120. Then, since the whole surfaces of the mirror plates 271, 271A of the rotary mirror devices 270, 270A can be made into a mirror surface, the centers of the mirror plates 271, 271A can be the rotational centers thereof. Thus, the rotary mirror devices 270, 270A can be made small in size.

The undulating section shape of convex and concave shape portions of the mirror surfaces 271a, 271Aa are formed unevenly. By doing so, laser beams shone onto the mirror surfaces 271a, 271Aa can be reflected at random, thereby making it possible to reduce speckle noise more effectively.

In addition, the mirror surface 271Aa of the mirror plate 271A is formed so as to be inclined relative to the rotational shaft 275a of the motor 275. By doing so, it is also possible to reduce effectively speckle noise of laser beams which are shone onto portions of the mirror surface 271Aa which surround the rotational center thereof.

The rotary mirror device 270 is disposed on the optical axis of the microlens array 171 on the exit side thereof. By doing so, the blue light source device 300 and the red light source device 120, as well as the optical equipment such as the first dichroic mirror 141 of the light guiding optical system 140 can be disposed in a compact fashion, thereby making it possible to provide the light source unit 60 which is made small in size.

The rotary mirror device 270 can also be disposed on the optical axis of the microlens array 171 on the entrance side thereof. By doing so, since laser beams which are reflected by the rotary mirror device 270 can be incident on the microlens array 171, it is possible to obtain clearer image light.

The diffusing plate 143 is disposed on the optical axis of the microlens array 171 on the entrance side thereof. By doing so, it is possible to diffuse light so as to match an effective surface of the microlens array 171.

The blue light source of the blue light source device 300 and the red light source of the red light source device 120 are made up of the laser diodes which are semiconductor light emitting devices. By doing so, it is possible to light source units 60, 60A which each include the high-intensity light source which consumes less electric power.

The blue laser diode 301 which emits light in the blue wavelength range is provided in the blue light source device 300, and the red laser diode 121 which emits light in the red wavelength range is provided in the red light source device 120. By doing so, it is possible to obtain bright and clear image light from each of the light in the blue wavelength range and the light in the red wavelength range.

The light source units 60, 60A each include the excitation light shining device 70 and the luminescent plate device 100. Then, the luminescent plate device 100 includes the luminescent material layer of the luminescent material which emits light in the green wavelength range. By doing so, it is possible to obtain light source light which is luminous light in the green wavelength range.

The projectors 10, 10A include, respectively, the light source units 60, 60A and also each include the display device 51, the projection-side optical system 200, and the projector control unit. By doing so, it is possible to obtain the projectors 10, 10A which can reduce speckle noise of light emitted from each of the laser diodes to thereby project clear image light. Namely, the projector control units control the light source units 60, 60A and the display devices 51.

Although a diameter of the mirror plate 271 is increased, the mirror surface 271a may be provided only on the radially outer area of the mirror plate 271 excluding the central portion thereof, so that light is shone onto the radially outer area of the mirror surface 271a. By adopting this configuration, since no light is shone onto the portion of the mirror plate 271 around the center thereof, it is possible to reduce speckle noise more from light emitted from each of the laser diodes.

In the embodiments described above, while the fixed luminescent plate 101 is described as being the green light source, the invention is not limited to this configuration. A rotary luminescent wheel (not shown) may be used which has a luminescent material provided along a full circumference thereof and which is driven to rotate by a motor. In this case, it is desirable that a rotation speed per unit time of the luminescent wheel is not caused to coincide with a rotation speed per unit time of the mirror plate 271 so that the luminescent wheel and the mirror plate 271 are not synchronized with each other. Controlling the mirror plate 271 and the luminescent wheel in this way can reduce speckle noise more from light emitted from each of the laser diodes.

While the embodiments of the invention have been described heretofore, these embodiments are presented as the examples and are not intended at all to limit the scope of the invention. The novel embodiments can be carried out in other various forms, and hence, various omissions, replacements and modifications can be made thereto without departing from the spirit and scope of the invention. The resulting embodiments and their modifications are included in the spirit and scope of the invention and are also included in the scope of inventions claimed for patent in claims and their equivalents.

What is claimed is:

1. A light source unit comprising:
   a semiconductor light emitting device; and
   a rotary mirror device having a mirror surface on a first side, and a second side to which a rotational shaft of a motor is connected, wherein the mirror surface has an undulating section shape of convex and concave shape portions, wherein
   the rotary mirror device is disposed so as to reflect light emitted from the semiconductor light emitting device on the mirror surface.

2. The light source unit according to claim 1, wherein the undulating section shape of convex and concave shape portions of the mirror surface is uneven.

3. The light source unit according to claim 1, wherein the construction of the undulating section shape of convex and concave shape portions of the mirror surface is anyone of:
   a construction in which curved surfaces which are raised in section and curved surfaces which are depressed in section are arranged successively and parallel in an alternate fashion;
   a construction in which both in a section along a first direction and a section along a second direction which is at right angles to the first direction, curved surfaces which are raised in section and curved surfaces which are depressed in section are arranged successively in an alternate fashion into a matrix configuration; and
   a construction in which curved surfaces which are raised in section and curved surfaces which are depressed in section are arranged successively sideways in an alternate fashion while caused to extend radially from a center towards an outer circumferential side of the mirror surface.

4. The light source unit according to claim 3, wherein in the construction in which the curved surfaces which are raised in section and the curved surfaces which are depressed in section are arranged into the matrix configuration, a pitch at which the curved surfaces which are raised in section and the curved surfaces which are depressed in section are formed is increased step by step from the center towards the outer circumferential side of the mirror surface.

5. The light source unit according to claim 1, wherein the mirror surface is formed so as to be inclined by a predetermined angle relative to a surface which is normal to the rotational shaft of the motor.

6. The light source unit according to claim 2, wherein the mirror surface is formed so as to be inclined by a predetermined angle relative to a surface which is normal to the rotational shaft of the motor.

7. The light source unit according to claim 3, wherein the mirror surface is formed so as to be inclined by a predetermined angle relative to a surface which is normal to the rotational shaft of the motor.

8. The light source unit according to claim 4, wherein the mirror surface is formed so as to be inclined by a predetermined angle relative to a surface which is normal to the rotational shaft of the motor.

9. The light source unit according to claim 1, comprising:
   a microlens array on which light emitted from the semiconductor light emitting device is incident, wherein the rotary mirror device is disposed on an optical axis of the microlens array on an exit side thereof.

10. The light source unit according to claim 2, comprising:
a microlens array on which light emitted from the semiconductor light emitting device is incident, wherein
the rotary mirror device is disposed on an optical axis of the microlens array on an exit side thereof.

11. The light source unit according to claim 3, comprising:
a microlens array on which light emitted from the semiconductor light emitting device is incident, wherein
the rotary mirror device is disposed on an optical axis of the microlens array on an exit side thereof.

12. The light source unit according to claim 4, comprising:
a microlens array on which light emitted from the semiconductor light emitting device is incident, wherein
the rotary mirror device is disposed on an optical axis of the microlens array on an exit side thereof.

13. The light source unit according to claim 1, comprising:
a microlens array on which light emitted from the semiconductor light emitting device is incident, wherein
the rotary mirror device is disposed on an optical axis of the microlens array on an entrance side thereof.

14. The light source unit according to claim 2, comprising:
a microlens array on which light emitted from the semiconductor light emitting device is incident, wherein
the rotary mirror device is disposed on an optical axis of the microlens array on an entrance side thereof.

15. The light source unit according to claim 3, comprising:
a microlens array on which light emitted from the semiconductor light emitting device is incident, wherein
the rotary mirror device is disposed on an optical axis of the microlens array on an entrance side thereof.

16. The light source unit according to claim 9, wherein
a diffusing plate is disposed on an optical axis of the microlens array on an entrance side thereof.

17. The light source unit according to claim 1, wherein
the semiconductor device is a laser diode.

18. The light source unit according to claim 17, wherein
the laser diode is disposed in a red light source device and a blue light source device as a red light source of the red light source device which emits light in the red wavelength range and blue light source of the blue light source device which emits light in the blue wavelength range.

19. The light source unit according to claim 1, comprising:
an excitation light shining device comprising an excitation light source; and
a luminescent plate device comprising a luminous light emitting area onto which light emitted from the excitation light shining device is shone to thereby emit luminous light in the green wavelength range.

20. A projector comprising:
the light source unit according to claim 1,
a display device onto which light source light from the light source unit is shone to thereby form image light;
a projection-side optical system for projecting the image light emitted from the display device onto a screen; and
a projector control unit for controlling the display device and the light source unit.

* * * * *